US011022830B2

(12) United States Patent
Li (10) Patent No.: US 11,022,830 B2
(45) Date of Patent: Jun. 1, 2021

(54) FLEXIBLE DISPLAY DEVICE

(71) Applicant: HUIZHOU CHINA STAR OPTOELECTRONICS TECHNOLOGY CO.,LTD., Huizhou Guangdong (CN)

(72) Inventor: Dehua Li, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 566 days.

(21) Appl. No.: 15/778,059

(22) PCT Filed: Jan. 26, 2018

(86) PCT No.: PCT/CN2018/074300
§ 371 (c)(1),
(2) Date: May 22, 2018

(87) PCT Pub. No.: WO2019/140712
PCT Pub. Date: Jul. 25, 2019

(65) Prior Publication Data
US 2021/0080773 A1    Mar. 18, 2021

(30) Foreign Application Priority Data

Jan. 18, 2018 (CN) .......................... 201810047895.2

(51) Int. Cl.
*G02F 1/1333* (2006.01)
*F21V 8/00* (2006.01)

(52) U.S. Cl.
CPC ....... *G02F 1/133314* (2021.01); *G02B 6/009* (2013.01); *G02F 1/13332* (2021.01);
(Continued)

(58) Field of Classification Search
None
See application file for complete search history.

(56) References Cited

U.S. PATENT DOCUMENTS 4,130,987 A * 12/1978 Schickedanz .......... G04B 19/08
368/282
9,817,437 B2 * 11/2017 Kim ........................ G06F 1/163
(Continued)

FOREIGN PATENT DOCUMENTS

| | | |
|---|---|---|
| CN | 205750191 U | 11/2016 |
| CN | 205942179 U | 2/2017 |

(Continued)

OTHER PUBLICATIONS

Chinese Office Action issued in corresponding Application No. 201810047895.2 dated May 8, 2019, pp. 1-6, Chinese Patent Office, Beijing, China.

*Primary Examiner* — Ryan Crockett
(74) *Attorney, Agent, or Firm* — Leong C. Lei (57) ABSTRACT

Disclosed is a flexible display device, comprising a rigid portion, in which a circuit board is provided; a flexible display portion, displaying an image. The circuit board is electrically connected with the flexible display portion. The flexible display portion comprises a first end and a second end, which are oppositely arranged, the first end is rotatably connected with one end of the rigid portion, the second end is provided with a first connecting member, and an end of the rigid portion away from the first end is provided with a second connecting member to cooperate with the first connecting member, and as the first connecting member is connected with the second connecting member, the rigid portion is connected to the flexible display portion end to end to form a ring structure. It is advantageous to switch between the unfolded state and the folded state of the flexible display device.

13 Claims, 6 Drawing Sheets

(52) U.S. Cl.
CPC .. *G02F 1/133317* (2021.01); *G02F 1/133331* (2021.01); *G02F 2201/46* (2013.01)

(56) References Cited

U.S. PATENT DOCUMENTS

| | | | |
|---|---|---|---|
| 2006/0020469 A1* | 1/2006 | Rast | G02F 1/167 |
| | | | 704/270 |
| 2007/0263276 A1* | 11/2007 | Takei | G02F 1/16756 |
| | | | 359/296 |
| 2012/0008267 A1* | 1/2012 | Watanabe | G06F 1/1652 |
| | | | 361/679.01 |
| 2013/0155723 A1* | 6/2013 | Coleman | G02B 6/0018 |
| | | | 362/621 |
| 2014/0042406 A1* | 2/2014 | Degner | H01L 27/3276 |
| | | | 257/40 |
| 2014/0362544 A1* | 12/2014 | Han | G04G 17/06 |
| | | | 361/749 |
| 2016/0210103 A1* | 7/2016 | Yoshizumi | H01L 27/14681 |
| 2016/0266672 A1* | 9/2016 | Inagaki | H01L 27/3297 |
| 2016/0299526 A1* | 10/2016 | Inagaki | G06F 3/04883 |
| 2018/0153049 A1* | 5/2018 | Song | H04M 1/0268 |

FOREIGN PATENT DOCUMENTS

| | | |
|---|---|---|
| CN | 106982524 A | 7/2017 |
| JP | 2015-141293 A | 8/2015 |
| WO | 00/59327 A1 | 10/2000 |

\* cited by examiner

FLEXIBLE DISPLAY DEVICE

RELATED APPLICATION

The present application is a National Phase of International Application Number PCT/CN2018/074300, filed on Jan. 26, 2018, and claims the priority of China Application No. 201810047895.2, filed on Jan. 18, 2018.

FIELD OF THE INVENTION

The present invention relates to a display field, and more particularly to a flexible display device.

BACKGROUND OF THE INVENTION

With the continuous progress of society, the development of liquid crystal displays has been rapid in recent years. For either of the display technology or the design, the current liquid crystal display has achieved a very significant improvement and change compared with the previous products. At present, the display is developed for flexibility. In comparison with conventional displays, the flexible displays can achieve bending with high curvature and expand more applications for displays.

In the prior art, the flexible display screen can only be fixed on a certain curvature arc, that is, the flexible display screen has only one display mode and the user experience is low.

SUMMARY OF THE INVENTION

The present application provides a flexible display device to solve the issues that the display mode is single and the user experience is low.

For solving the aforesaid technical issue, the present invention provides a flexible display device, comprising:

a rigid portion, in which a circuit board is provided;

a flexible display portion, displaying an image, wherein the circuit board is electrically connected with the flexible display portion;

wherein the flexible display portion comprises a first end and a second end, which are oppositely arranged, the first end is rotatably connected with one end of the rigid portion, the second end is provided with a first connecting member, and an end of the rigid portion away from the first end is provided with a second connecting member to cooperate with the first connecting member, and as the first connecting member is connected with the second connecting member, the rigid portion is connected to the flexible display portion end to end to form a ring structure.

A thickness of the rigid portion is equal to a thickness of the flexible display portion.

The flexible display portion comprises a flexible back plate and a flexible display panel fixed on the flexible back plate, and flexible back plate is rotatably connected to the rigid portion, and the flexible display panel is electrically connected to the circuit board to display the image.

A thickness of the rigid portion is equal to a thickness of the flexible display portion.

The flexible display device further comprises a first support plate and a second support plate, which are rotatably connected, wherein the circuit board is fixed on the first support plate, and the flexible back plate comprises a first side surface and a second side surface, which are oppositely arranged, and the first side surface is at least partially attached to the second support plate, and the flexible display panel is arranged on the second side surface.

A thickness of the rigid portion is equal to a thickness of the flexible display portion.

The flexible display panel comprises a backlight source, a light guide plate and a liquid crystal panel, and the light guide plate and the liquid crystal panel are sequentially stacked on the flexible back plate, and the backlight source is located on the flexible back plate, and the backlight source is located on a side of the light guide plate near the rigid portion, and the light guide plate guides the light from the backlight source to the liquid crystal panel to display the image, and a vertical projection of the backlight source on the flexible back plate falls within a range of the second support plate, and a vertical projection of the light guide plate on the flexible back plate intersects with the second support plate.

A thickness of the rigid portion is equal to a thickness of the flexible display portion.

The flexible display device further comprises a pleated connecting cover, wherein the pleated connecting cover is connected between the rigid portion and the flexible display portion, and the pleated connecting cover corresponds to a connection position between the first support plate and the second support plate.

A thickness of the rigid portion is equal to a thickness of the flexible display portion.

The rigid portion comprises a front frame and a side frame, and the front frame is arranged opposite to the first support plate, and the circuit board is received in an accommodating space formed by the front frame, the side frame and the first support plate, and the flexible display portion further comprises a transparent cover plate, and the transparent cover plate is located on a side of the flexible display panel away from the flexible back plate, and one end of the pleated connecting cover is fixed on the front frame and an other end of the pleated connecting cover is fixed on the transparent cover plate.

A thickness of the rigid portion is equal to a thickness of the flexible display portion.

As the flexible display device is unfolded, the front frame is aligned with the transparent cover, and the one end of the pleated connecting cover is attached to a side of the front frame facing the first support plate, and the other end of the pleated connecting cover is attached to a side of the transparent cover plate away from the second support plate.

A thickness of the rigid portion is equal to a thickness of the flexible display portion.

The first connecting member is fixed on the flexible back plate, and the second connecting member is fixed on the side frame.

A thickness of the rigid portion is equal to a thickness of the flexible display portion.

The first connecting member is a hook, and the second connecting member is a buckle.

A thickness of the rigid portion is equal to a thickness of the flexible display portion.

The benefits of the present invention are: the flexible display device has two display modes, the unfolded state and the folded state. The display modes are various. Furthermore, in the folded state, the rigid portion is not bent to protect the circuit board inside the rigid portion and the flexible display portion is bent to form a cylindrical display surface. One end of the flexible display portion is rotatably connected with the rigid portion, and the connection is simple. The other end of the flexible display portion and the rigid portion are connected with the first connecting member and the second connecting member. The connection is firm and is detachable, which is favorable for switching the flexible display device between the unfolded state and the folded state. The display mode of the flexible display device is flexible and the user experience is improved.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other obvious various embodiments according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
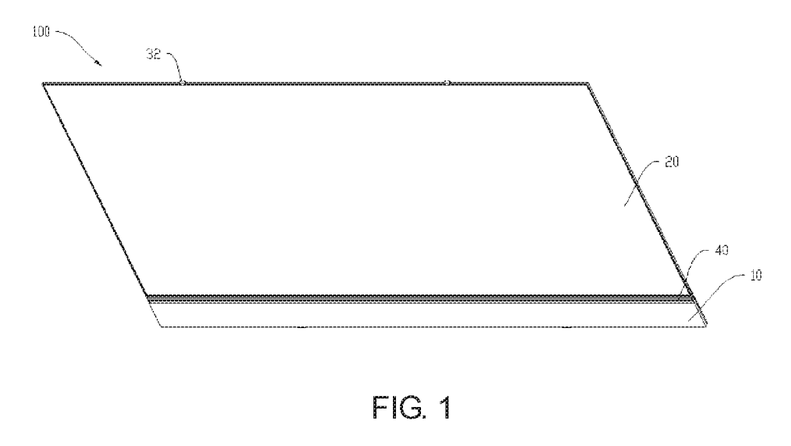
FIG. 1 is a diagram of an unfolded state of a flexible display device according to an embodiment of the present invention.
Figure 2:
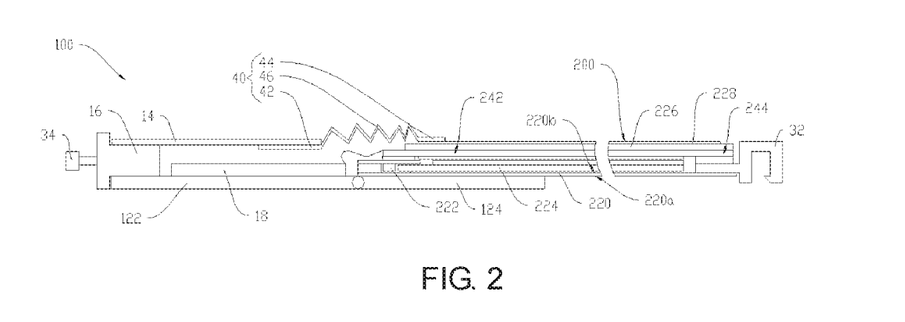
FIG. 2 is a diagram of an internal structure of an unfolded state of a flexible display device according to an embodiment of the present invention.
Figure 3:
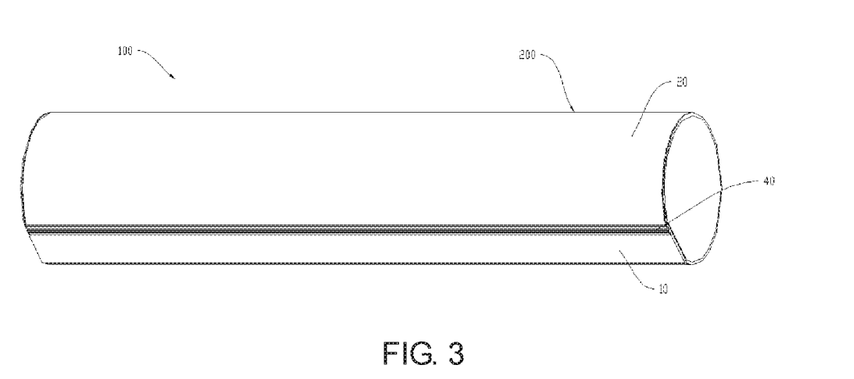
FIG. 3 is a diagram of a folded state of a flexible display device according to an embodiment of the present invention.
Figure 4:
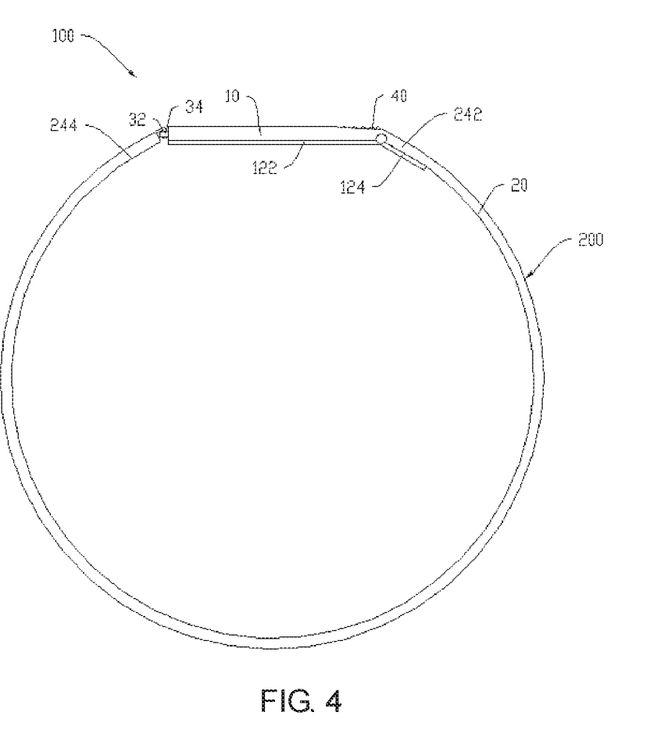
FIG. 4 is a side view diagram of a folded state of a flexible display device according to an embodiment of the present invention.

Please refer from FIG. 1 to FIG. 4. The flexible display device 100 provided by the embodiment of the present invention comprises a rigid portion 10 and a flexible display portion 20. The rigid portion 10 and the flexible display portion 20 are rotatably connected. In one embodiment, the rigid portion 10 and the flexible display portion 20 are hinged to each other so that the rigid portion 10 and the flexible display portion 20 can rotate relative to each other. In this embodiment, the rigid portion 10 is not easy to bend. With conjunction of FIG. 5, the rigid portion 10 is provided with a circuit board 18 inside. The rigid portion 10 protects the circuit board 18 so as to prevent the circuit board 18 from being broken after being bent. In this embodiment, the rigid portion 10 has a hollow cuboid shape. A thickness of the rigid portion 10 is smaller than a length and a width of the rigid portion 10. The rigid portion 10 may also be a sheet structure. Furthermore, the flexible display portion 20 possesses flexible and bendable characteristics. Specifically, the flexible display portion 20 is used for displaying an image. With FIG. 5, the flexible display portion 20 is electrically connected to the circuit board 18 in the rigid portion 10 so that the circuit board 18 can drive the flexible display portion 20 to display the image. In one embodiment, the flexible display portion 20 is electrically connected to the circuit board 18 via a flexible printed circuit board. In other embodiments, the flexible display portion 20 and the circuit board 18 may also be electrically connected by an electrical wire. The flexible display portion 20 comprises a display surface 200 for displaying images. As the flexible display portion 20 is bent, the flexible display portion 20 is bent toward the side away from the display surface 200. Namely, as the flexible display portion 20 is folded in a ring shape, the display surface 200 always faces outward for displaying the images outward. Furthermore, as the flexible display portion 20 is unfolded, the flexible display portion 20 has a cuboid shape. The thickness of the flexible display portion 20 is smaller than a length and a width of the flexible display portion 20. The flexible display portion 20 may also be a sheet structure. Obviously, in case that the thickness of the flexible display portion 20 is smaller, the bending of the flexible display portion 20 is better. Specifically, as shown in FIG. 1, which is a flexible display device 100 in an unfolded state, the flexible display portion 20 displays the images. The rigid portion 10 is located at one side of the flexible display portion 20 and drives the flexible display portion 20 to display the images. In one embodiment, one side surface of the flexible display portion 20 is the display surface 200. Namely, the entire side surface of the flexible display portion 20 can display the image, and the wires and circuit board 18 are arranged inside the rigid portion 10. Specifically, as shown in FIG. 3, which is a flexible display device 100 in a folded state, as the flexible display device 100 is folded, the rigid portion 20 is connected to the flexible display portion 20 end to end to form a ring structure. With FIG. 4, which is side view diagram of a flexible display device 100 in a folded state, the side view of the flexible display device 100 in the folded state is in a ring shape. Furthermore, the display surface 200 of the flexible display device 100 is at the outward of the ring so that the flexible display device 100 displays the image approximately in 360 degrees outward. In one embodiment, the size of the rigid portion 10 is decreased and the size of the flexible display portion 20 is increased to increase the display range of the flexible display device 100. Namely, by decreasing the size of the rigid portion 10 and increasing the size of the flexible display portion 20, the display range of the flexible display device 100 approaches to 360 degrees.

The flexible display device 100 has two display modes, the unfolded state and the folded state. The display modes are various. Furthermore, in the folded state, the rigid portion 10 is not bent to protect the circuit board 18 inside the rigid portion 10 and the flexible display portion 20 is bent to form a cylindrical display surface 200. The flexible display device 100 can be switched between the unfolded state and the folded state. The display mode of the flexible display device 100 is flexible and the user experience is improved.

Figure 5:
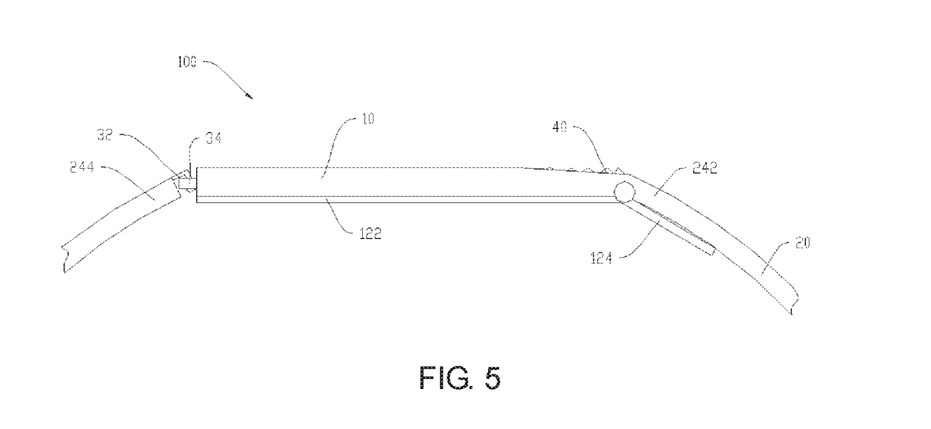
FIG. 5 is a partially enlarged view diagram of FIG. 4.

Please refer to FIG. 5. FIG. 5 is a partially enlarged view diagram of the flexible display device 100. Specifically, FIG. 5 is a structural diagram of a connection position of the rigid portion 10 and the flexible display portion 20 of the flexible display device 100. In this embodiment, the flexible display portion 20 comprises a first end 242 and a second end 244, which are oppositely arranged. Furthermore, the first end 242 and the second end 244 are located in the longitudinal direction of the flexible display portion 20, that is, in a direction, in which the flexible display portion 20 can be bent. The first end 242 is rotatably connected with one end of the rigid portion 10. In one embodiment, the first end 242 is hinged with one end of the rigid portion 10. Thus, the rigid portion 10 can be bent relative to the flexible display portion 20. The second end 242 is provided with a first connecting member 32, and an end of the rigid portion 10 away from the first end 242 is provided with a second connecting member 34 to cooperate with the first connecting member 32. As the first connecting member 32 is connected with the second connecting member 34, the rigid portion 10 is connected to the flexible display portion 20 end to end to form a ring structure. In one embodiment, the first connecting member 32 and the second connecting member 34 are locking members matched with each other, such as a buckle structure. In other embodiments, the first connecting member 32 and the second connecting member 34 are mutually compatible magnetic members, which can be fixed to each other and can be separated from each other. Furthermore, with FIG. 4, as the first connecting member 32 and the second connecting member 34 are connected, the flexible display portion 20 is wound to form a curved structure. The first end 242 and the second end 244 of the flexible display portion 20 are respectively connected to two ends of the rigid portion 10 such that the flexible display portion 20 is connected with the rigid portion 10 to form an enclosed ring. In one embodiment, the curvatures of respective flexible positions of the flexible display portion 20 are the same. Namely, the flexible display portion 20 is wound to form a circular arc.

The flexible display device 100 has two display modes, the unfolded state and the folded state. The display modes are various. Furthermore, in the folded state, the rigid portion 10 is not bent to protect the circuit board 18 inside the rigid portion 10 and the flexible display portion 20 is bent to form a cylindrical display surface 200. One end of the flexible display portion 20 is rotatably connected with the rigid portion 10, and the connection is simple. The other end of the flexible display portion 20 and the rigid portion 10 are connected with the first connecting member 32 and the second connecting member 34. The connection is firm and is detachable, which is favorable for switching the flexible display device 100 between the unfolded state and the folded state. The display mode of the flexible display device 100 is flexible and the user experience is improved.

In one embodiment, the first connecting member 32 is a hook and the second connecting member 34 is a buckle. The hook and the buckle are easy to be buckled together, and can be easily disassembled. The buckled result is good and the service life is long. In one embodiment, as shown in FIG. 1, the number of first connecting member 32 and the number of second connecting member 34 may be multiple, and the number of first connecting member 32 and the number of second connecting member 34 are equal. The first connecting members 32 are uniformly distributed on the second end 244 of the flexible display portion 20. Correspondingly, the second connecting members 34 are uniformly distributed on the end of the rigid portion 10 away from the first end 242. Accordingly, the locking capability of the first connecting members 32 and the second connecting members 34 can be enhanced to improve the structure stability of the flexible display device 100 in the folded (wound) state.

Figure 6:
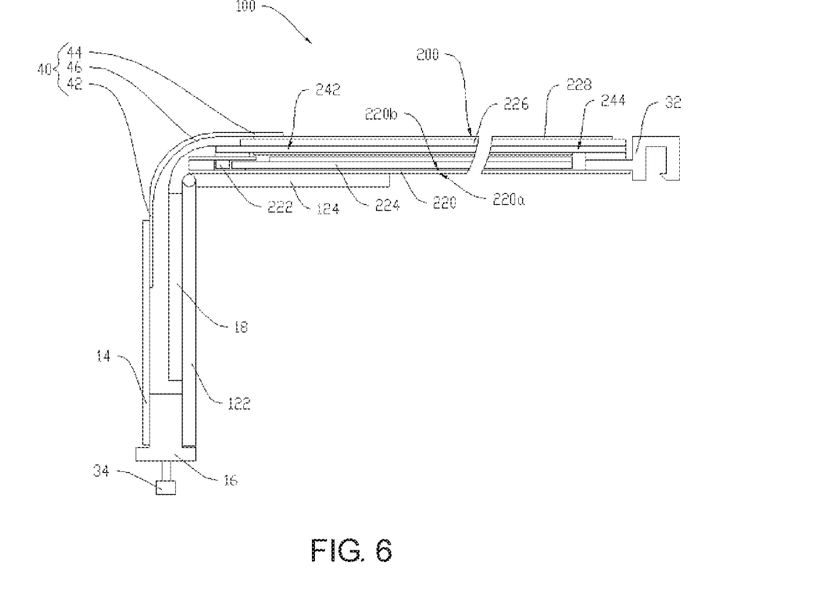
FIG. 6 is a diagram of an internal structure of a flexible display device as a rigid portion and a flexible display portion are bent relative to each other.

Please refer to FIG. 2 and FIG. 6, In this embodiment, the flexible display portion 20 comprises a flexible back plate 220 and a flexible display panel fixed on the flexible back plate 220, and the flexible back plate 220 is rotatably connected to the rigid portion 10, and the flexible display panel is electrically connected to the circuit board 18 to display the image. Specifically, the flexible back plate 220 is a support board of the flexible display section 20. The flexible back plate 220 is flexible and bendable, and the flexible back plate 220 is not easy to break, so as to maintain the stability of the overall structure of the flexible display section 20. The flexible display panel also possesses a flexible and bendable characteristic. The flexible display panel is fixed on the flexible back plate 220 by sticking, and the flexible display panel and the flexible back plate 220 can be bent, together. In this embodiment, the flexible back plate 220 is rotatably connected to the rigid portion 10 to realize the rotational connection of the flexible display portion 20 and the rigid portion 10. Furthermore, one end of the flexible back plate 220 is rotatably connected with the rigid portion 10, that is, one end of the flexible back plate 220 corresponding to the first end 242 of the flexible display portion 20 is rotatably connected with the rigid portion 10. The flexible back plate 220 is used as a substrate of the flexible display portion 20 and only the flexible back plate 220 is directly connected with the rigid portion 10. As the flexible display panel and other components are damaged, only the flexible display panel can be removed from the flexible back plate 220 without separating the flexible display portion 20 from the rigid portion 10. The maintenance process is simplified for saving the product maintenance costs. Furthermore, in comparison with the rotational connection of the flexible display panel and the rigid section 10, the flexible back plate 220 has a simple structure and a low material cost. In case that the connection position is bent too many times and damaged, the replacement of the flexible back plate 220 has lower maintenance cost. Certainly, the flexible back plate 220 is also more resistant to wear in comparison with the flexible display panel.

Still refer to FIG. 2 and FIG. 6. In this embodiment, the flexible display device 100 further comprises a first support plate 122 and a second support plate 124, which are rotatably connected. The circuit board 18 is fixed on the first support plate 122, and the flexible back plate 200 comprises a first side surface 220a and a second side surface 220b, which are oppositely arranged. The first side surface 220a is at least partially attached to the second support plate 124, and the flexible display panel is arranged on the second side surface 220b. Specifically, the first support plate 122 and the second support plate 124 are support plates, which are rigid and not easily bent. In one embodiment, the first support plate 122 and the second support plate 124 are steel sheets. The first support plate 122 is fixed on the rigid portion 10, or the first support plate 122 is a base plate of the rigid portion 10 and maintains the rigid strength of the rigid portion 10. The circuit board 18 is arranged on the first support plate 122 so that under the protection of the first support plate 122, the circuit board 18 will not be acted by a bending force, thereby ensuring the long-term use of the circuit board 18. The first side surface 220a of the flexible back plate 220 is attached to the second support plate 124. Specifically, the end of the flexible back plate 220 near the first end 242 is attached on the second support plate 124, and the second support plate 124 only supports the end of the flexible back plate 220 near the first end 242. Thus, the end of the flexible back plate 220 near the first end 242 is not easy to bend. Then, the structure including flexible display panel in the position of the flexible display portion 20 at the first end 242 will not be bent. Furthermore, the portion of the flexible back plate 220, which is not attached with the second support plate 124, is not restrained by the second support plate 124, and may be bent and folded (wound). In this embodiment, the flexible display panel is arranged on the second side surface 220b. The second support plate 124 will not be bent at the first end 242 of the flexible display portion 20, thereby protecting the elements inside the first end 242 from being broken due to bending.

Specifically, the flexible display panel comprises a backlight source 222, a light guide plate 224 and a liquid crystal panel 226. The light guide plate 224 and the liquid crystal panel 226 are sequentially stacked on the flexible back plate 220. The backlight source 222 is located on the flexible back plate 220, and the backlight source 222 is located on a side of the light guide plate 224 near the rigid portion 10. The light guide plate 224 guides the light from the backlight source 222 to the liquid crystal panel 226 to display the image. A vertical projection of the backlight source 222 on the flexible back plate 220 falls within a range of the second support plate 124, and a vertical projection of the light guide plate 224 on the flexible back plate 220 intersects with the second support plate 124. In this embodiment, the backlight source 222 is a side light type guiding structure. Namely, the backlight of the backlight source 222 is incident into the light guide plate 224 from one side of the light guide plate 224 and passes through the light guide plate 224. The backlight is deflected by about 90 degrees in the direction of light propagation in the light guide plate 224 and then exits from the side of the light guide plate 224 facing the liquid crystal panel 226. Then, the backlight penetrates through the liquid crystal panel 226 and the liquid crystal panel 226 displays the image. In one embodiment, the flexible display panel further comprises a reflective sheet and a diffusion sheet for improving the light path effect. In this embodiment, the vertical projection of the backlight source 222 on the flexible back plate 220 falls within the range of the second support plate 124, and the vertical projection of the light guide plate 224 on the flexible back plate 220 intersects with the second support plate 124. In the other words, the second support plate 124 supports the backlight source 222 and the end of the light guide plate 224 facing the backlight source 222. The end of the light guide plate 224 facing the backlight source 222 will not be bent. The distance between the backlight source 222 and the light guide plate 224 does not change, and the light coupling quality of the backlight source 222 to the light guide plate 224 will not be affected. The brightness and the result of the display image of the flexible display panel are better. Whether the flexible display device 100 is in the unfolded state or the folded state, the display result of the flexible display panel is not affected.

Still refer to FIG. 2 and FIG. 6. In this embodiment, the flexible display device 100 further comprises a pleated connecting cover 40. The pleated connecting cover 40 is connected between the rigid portion 10 and the flexible display portion 20. The pleated connecting cover 40 corresponds to a connection position between the first support plate 122 and the second support plate 124. Specifically, the connection position of the pleated connection cover 40 between the rigid portion 10 and the flexible display portion 20 is the connection location of the pleated connecting cover 40 corresponding to the rigid portion 10 and the flexible display portion 20. Furthermore, the pleated connecting cover 40 is used to form a partial appearance of the flexible display device 100. Specifically, as shown in FIG. 2, as the flexible display device 100 is in the unfolded state, the rigid portion 10 is in line with the flexible display portion 20. The pleated connecting cover 40 is in a folded state. The pleated connecting cover 40 covers the connection position between the rigid portion 10 and the flexible display portion 20, and the pleated connecting cover 40 occupies less space. Specifically, as shown in FIG. 6, as the flexible display device 100 is in the folded state, the rigid portion 10 is bent relative to the flexible display portion 20, that is, an angle is formed between the rigid portion 10 and the flexible display portion 20. In one embodiment, the angle formed between the rigid portion 10 and the flexible display portion 20 is 90 degrees. Then, the pleated connecting cover 40 is in an extended state. The pleated connecting cover 40 is stretched into a flat surface but the pleated connecting cover 40 still covers the connection position between the rigid portion 10 and the flexible display portion 20. Since the rigid portion 10 is bent relative to the flexible display portion 20, the position of the pleated connecting cover 40 is in the position, of which the bending radius is the largest. The length of the pleated connecting cover 40 can be compressed or extended. The pleated connecting cover 40 does not occupy too much space as being compressed, and the pleated connecting cover 40 will not be easily broken due to being stretched as being extended. In other words, the pleated connecting cover 40 can meet the usage requirements for the flexible display device 100 in the unfolded state and in the folded state, and can improve the structural stability of the flexible display device 100.

Please refer to FIG. 2. In this embodiment, the rigid portion 10 comprises a front frame 14 and a side frame 16. The front frame 14 is arranged opposite to the first support plate 122, and the circuit board 18 is received in an accommodating space formed by the front frame 14, the side frame 16 and the first support plate 122. Furthermore, the front frame 14, the side frame 16 and the first support plate 122 are all rigid structures and are not easily bent. The circuit board 18 accommodated in the accommodating space can be well protected from being bent or broken by the external force. In this embodiment, the flexible display portion 20 further comprises a transparent cover plate 228, and the transparent cover plate 228 is located on a side of the flexible display panel away from the flexible back plate 220. The transparent cover 228 is adhered on the surface of the liquid crystal panel 226 to protect the liquid crystal panel 226 and prevent the liquid crystal panel 226 from being scratched. Still refer to FIG. 2. In this embodiment, one end of the pleated connecting cover 40 is fixed on the front frame 14 and another end of the pleated connecting cover is fixed on the transparent cover plate 228. Specifically, the pleated connecting cover 40 comprises a first connecting section 42, a second connecting section 44 and a folded section 46. The folded section 46 is located between the first connecting section 42 and the second connecting section 44. The first connecting section 42 is fixedly connected to the front frame 14 so that the pleated connecting cover 40 is fixedly connected to the rigid portion 10. The second connecting section 44 is fixedly connected to the transparent cover plate 228 so that the pleated connecting cover 40 is fixedly connected with the flexible display portion 20. As winding (folding) the flexible display device 100, the rigid portion 10 stretches the folded section 46 via the first connecting section 42, and the flexible display portion 20 stretches the folded section 46 via the second connecting section 44. As unfolding the flexible display device 100, the rigid portion 10 compresses the folded section 46 via the first connecting section 42, and the flexible display portion 20 compresses the folded section 46 via the second connecting section 44.

Still refer to FIG. 2. In this embodiment, as the flexible display device 100 is unfolded, the front frame 14 is aligned with the transparent cover 228, and the one end of the pleated connecting cover 40 is attached to a side of the front frame 14 facing the first support plate 122, and the other end of the pleated connecting cover 40 is attached to a side of the transparent cover plate 228 away from the second support plate 124. Specifically, the first connecting section 42 of the pleated connecting cover 40 is attached to the side of the front frame 14 facing the first support plate 122, and the second connecting section 44 of the pleated connecting cover 40 is attached to the side of the transparent cover plate 228 away from the second support plate 124. The connection strength of the pleated connecting cover 40 with the rigid portion 10 and the flexible display section 20 can be increased. The pleated connecting cover 40 can be prevented from falling off as the flexible display device 100 is wound and unfolded many times.

Please refer to FIG. 2. In this embodiment, the first connecting member 32 is fixed on the flexible back plate 220, and the second connecting member 34 is fixed on the side frame 16. The flexible back plate 220 is a base plate of the flexible display portion 20. As the first connecting member 32 and the second connecting member 34 are locked, the first connecting member 32 and the second support plate 124 stretch the flexible back plate 220 from the two ends of the flexible back plate 220. The light guide plate 224, the liquid crystal panel 226 and other elements on the flexible back plate 220 are not affected by the stretching force. The flexible display portion 20 has a stable structure and is not easily damaged. The second connecting member 34 is fixed on the side frame 16. Namely, the second connecting member 34 is fixedly connected to the first support plate 122 and the front frame 14. The second connecting member 34 is firm and does not easily come off from the rigid portion 10, which improves the structural stability of the flexible display device 100 in the folded (wound) state.

In one embodiment, the thickness of the rigid portion 10 is the same as the thickness of the flexible display portion 20. As the flexible display device 100 is in the unfolded state, the integrated condition of the flexible display device 100 is better and the user experience is improved.

The flexible display device 100 has two display modes, the unfolded state and the folded state. The display modes are various. Furthermore, in the folded state, the rigid portion 10 is not bent to protect the circuit board 18 inside the rigid portion 10 and the flexible display portion 20 is bent to form a cylindrical display surface 200. One end of the flexible display portion 20 is rotatably connected with the rigid portion 10, and the connection is simple. The other end of the flexible display portion 20 and the rigid portion 10 are connected with the first connecting member 32 and the second connecting member 34. The connection is firm and is detachable, which is favorable for switching the flexible display device 100 between the unfolded state and the folded state. The display mode of the flexible display device 100 is flexible and the user experience is improved.

Above are embodiments of the present invention, which does not limit the scope of the present invention. Any modifications, equivalent replacements or improvements within the spirit and principles of the embodiment described above should be covered by the protected scope of the invention.

What is claimed is:

1. A flexible display device, comprising:
    a rigid portion, in which a circuit board is provided;
    a flexible display portion, displaying an image, wherein the circuit board is electrically connected with the flexible display portion;
    wherein the flexible display portion comprises a first end and a second end, which are oppositely arranged, the first end is rotatably connected with one end of the rigid portion, the second end is provided with a first connecting member, and an end of the rigid portion away from the first end is provided with a second connecting member to cooperate with the first connecting member, and as the first connecting member is connected with the second connecting member, the rigid portion is connected to the flexible display portion end to end to form a ring structure;
    wherein the flexible display portion comprises a flexible back plate and a flexible display panel fixed on the flexible back plate, and flexible back plate is rotatably connected to the rigid portion, and the flexible display panel is electrically connected to the circuit board to display the image;
    further comprising a first support plate and a second support plate, which are rotatably connected, wherein the circuit board is fixed on the first support plate, and the flexible back plate comprises a first side surface and a second side surface, which are oppositely arranged, and the first side surface is at least partially attached to the second support plate, and the flexible display panel is arranged on the second side surface;
    wherein the flexible display panel comprises a backlight source, a light guide plate and a liquid crystal panel, and the light guide plate and the liquid crystal panel are sequentially stacked on the flexible back plate, and the backlight source is located on the flexible back plate, and the backlight source is located on a side of the light guide plate near the rigid portion, and the light guide plate guides the light from the backlight source to the liquid crystal panel to display the image, and a vertical projection of the backlight source on the flexible back plate falls within a range of the second support plate, and a vertical projection of the light guide plate on the flexible back plate intersects with the second support plate;
    further comprising a pleated connecting cover, wherein the pleated connecting cover is connected between the rigid portion and the flexible display portion, and the pleated connecting cover corresponds to a connection position between the first support plate and the second support plate; and
    wherein the rigid portion comprises a front frame and a side frame, and the front frame is arranged opposite to the first support plate, and the circuit board is received in an accommodating space formed by the front frame, the side frame and the first support plate, and the flexible display portion further comprises a transparent cover plate, and the transparent cover plate is located on a side of the flexible display panel away from the flexible back plate, and one end of the pleated connecting cover is fixed on the front frame and an other end of the pleated connecting cover is fixed on the transparent cover plate.

2. The flexible display device according to claim 1, wherein a thickness of the rigid portion is equal to a thickness of the flexible display portion.

3. The flexible display device according to claim 1, wherein a thickness of the rigid portion is equal to a thickness of the flexible display portion.

4. The flexible display device according to claim 1, wherein a thickness of the rigid portion is equal to a thickness of the flexible display portion.

5. The flexible display device according to claim 1, wherein a thickness of the rigid portion is equal to a thickness of the flexible display portion.

6. The flexible display device according to claim 1, wherein a thickness of the rigid portion is equal to a thickness of the flexible display portion.

7. The flexible display device according to claim 1, wherein a thickness of the rigid portion is equal to a thickness of the flexible display portion.

8. The flexible display device according to claim 1, wherein as the flexible display device is unfolded, the front frame is aligned with the transparent cover, and the one end of the pleated connecting cover is attached to a side of the front frame facing the first support plate, and the other end of the pleated connecting cover is attached to a side of the transparent cover plate away from the second support plate.

9. The flexible display device according to claim 8, wherein a thickness of the rigid portion is equal to a thickness of the flexible display portion.

10. The flexible display device according to claim 8, wherein the first connecting member is fixed on the flexible back plate, and the second connecting member is fixed on the side frame.

11. The flexible display device according to claim 10, wherein a thickness of the rigid portion is equal to a thickness of the flexible display portion.

12. The flexible display device according to claim 10, wherein the first connecting member is a hook, and the second connecting member is a buckle.

13. The flexible display device according to claim 12, wherein a thickness of the rigid portion is equal to a thickness of the flexible display portion.

* * * * *